United States Patent
Gundu Rao et al.

(10) Patent No.: US 11,812,425 B2
(45) Date of Patent: *Nov. 7, 2023

(54) DEVICES, SYSTEMS AND METHODS FOR LOW LATENCY DATA TRANSMISSION IN WIRELESS NETWORK

(71) Applicant: Cypress Semiconductor Corporation, San Jose, CA (US)

(72) Inventors: Rajendra Kumar Gundu Rao, Bangalore (IN); Kamesh Medapalli, San Jose, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 165 days.

This patent is subject to a terminal disclaimer.

(21) Appl. No.: 17/479,921

(22) Filed: Sep. 20, 2021

(65) Prior Publication Data

US 2022/0022203 A1 Jan. 20, 2022

Related U.S. Application Data

(63) Continuation of application No. 16/436,660, filed on Jun. 10, 2019, now Pat. No. 11,140,688.

(51) Int. Cl.
*H04W 72/12* (2023.01)
*H04W 72/121* (2023.01)
*H04W 74/08* (2009.01)
*H04W 52/02* (2009.01)
*H04W 72/1273* (2023.01)
*H04W 72/21* (2023.01)
*H04W 72/23* (2023.01)
*H04W 84/12* (2009.01)

(52) U.S. Cl.
CPC ...... *H04W 72/121* (2013.01); *H04W 52/0216* (2013.01); *H04W 52/0219* (2013.01); *H04W 52/0222* (2013.01); *H04W 72/1273* (2013.01); *H04W 72/21* (2023.01); *H04W 72/23* (2023.01); *H04W 74/0808* (2013.01); *H04W 84/12* (2013.01)

(58) Field of Classification Search
CPC ... H04W 72/121; H04W 72/21; H04W 72/23; H04W 52/0216; H04W 52/0219; H04W 52/0222; H04W 72/1273; H04W 74/0808; H04W 84/12
See application file for complete search history.

(56) References Cited

U.S. PATENT DOCUMENTS

| | | | |
|---|---|---|---|
| 2019/0149280 A1* | 5/2019 | Seok | H04B 7/0617 370/329 |
| 2019/0274140 A1* | 9/2019 | Noh | H04W 88/02 |
| 2021/0014871 A1* | 1/2021 | Merlin | H04W 72/12 |

* cited by examiner

*Primary Examiner* — Rhonda L Murphy

(57) ABSTRACT

Embodiments can include a method in which a transmission duration for data frames to a plurality of different receiving devices is determined by a transmitting device. The transmission duration can include at least interframe spacings that separate the data frames from one another. The transmitting device can transmit a control message over a medium to reserve the medium for the transmission duration. The data frames can then be sequentially transmitted by the transmitting device to the plurality of receiving devices during the transmission duration. The transmitting device can operate according to a contention based protocol. Related devices and systems are also disclosed.

20 Claims, 12 Drawing Sheets

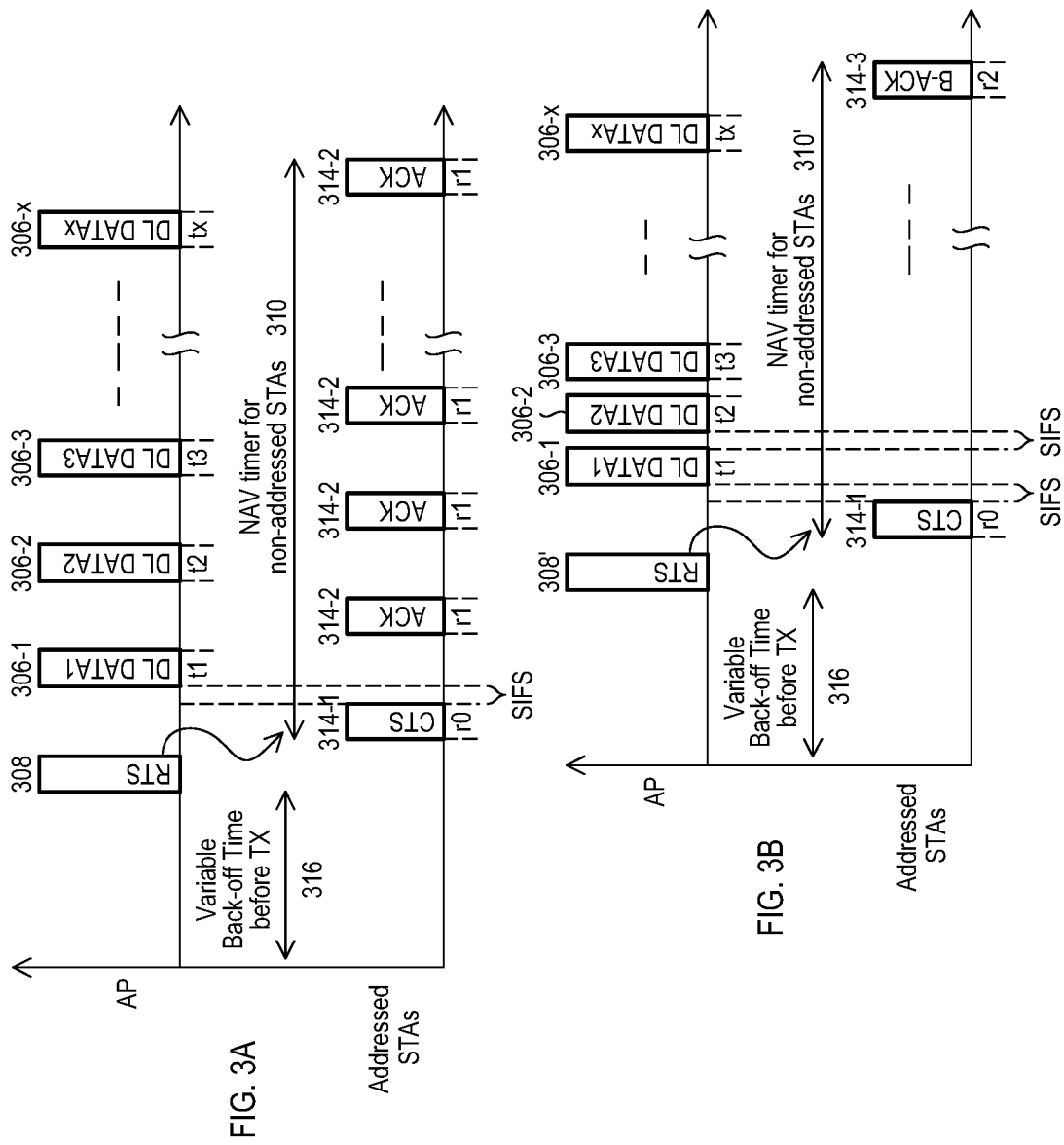
FIG. 3A
FIG. 3B
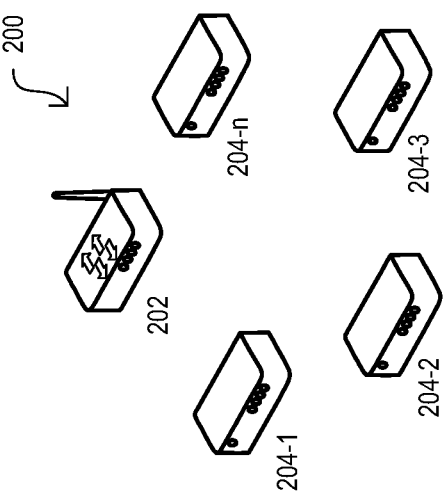
FIG. 2

(BACKGROUND)

DEVICES, SYSTEMS AND METHODS FOR LOW LATENCY DATA TRANSMISSION IN WIRELESS NETWORK

CROSS-REFERENCE TO RELATED APPLICATION

This application is a continuation of U.S. patent application Ser. No. 16/436,660, filed on Jun. 10, 2019, which is incorporated by reference herein in its entirety.

TECHNICAL FIELD

The present disclosure relates generally to wireless networks, and more particularly to wireless networks where an access point transmits data to different stations with a predetermined latency.

BACKGROUND

Conventional audio-visual systems are increasingly using WLAN technologies to stream real time audio information to multiple speakers. To ensure acceptable audio synchronization with images (i.e., lip-sync), the latencies of audio transport over a wireless network should be tightly constrained to within a few tens of milliseconds (e.g., 20-30 ms). Standard WLAN protocols are not designed to meet these constraints and so cannot always provide acceptable performance.

For example, a system can generate one set of audio data every 20 ms. There can be ten speakers to which the audio data needs to be sent. Each audio stream includes 96 Kbps of 24-bit data, for an overall data rate of about 2.3 Mbps. This translates to 5760 bytes or about five packets or MAC Protocol Data Units (MPDUs) per audio stream every 20 ms. Thus, a system of ten speakers will have to provide 50 MPDUs every 20 ms.

FIG. 15 is a timing diagram of a conventional WLAN system showing transmissions for an access point (AP) and a station (STA). AP is to transmit a sequence of data packets (DL DATA1 to DL DATAx), which can together provide 20 ms of audio for the receiving STAs. As shown, in conventional WLAN operations, an AP can have a variable back-off time 1501-1/2 before attempting to take control of the medium to transmit data to a STA. Following the back-off time, AP can transmit a Request-To-Send frame (RTS). The RTS can include a Network Allocation Vector (NAV) which can indicate to non-addressed stations that the medium will be used by the AP (and addressed STA), thus avoiding contention. In response to the RTS, the addressed STA can return a Clear-To-Send frame (CTS) frame. Upon receiving the CTS, the AP can transmit a data frame. Upon receiving the data frame, the addressed STA can issue an acknowledgement (ACK). The AP receives the ACK for a data frame, and the process can be repeated for a next data STA.

Referring still to FIG. 15, the NAV for RTS1 can be used to clear the medium for transmission of data frame DL DATA1. Subsequently, the AP will have to wait for a second variable back-off time 1501-2 before attempting to send the next data frame (DL DATA2). Thus, the transmission of data to each STA can be preceded by a variable back-off time. The presence of variable back-off times can prevent a guaranteed latency for the transmitted data frames. Consequently, the requirements for real time transmission of data, such as audio data, cannot be met.

It would be desirable to arrive at some way of ensuring a particular data transmission latency in a wireless system.

BRIEF DESCRIPTION OF THE DRAWINGS

FIG. 2 is a block diagram of a Wireless Local Area Network (WLAN) according to an embodiment.

FIGS. 3A and 3B are timing diagrams showing data transmission operations in which a request-to-send frame can establish a transmission duration for data bursts to multiple stations.

DETAILED DESCRIPTION

Figure 1A:
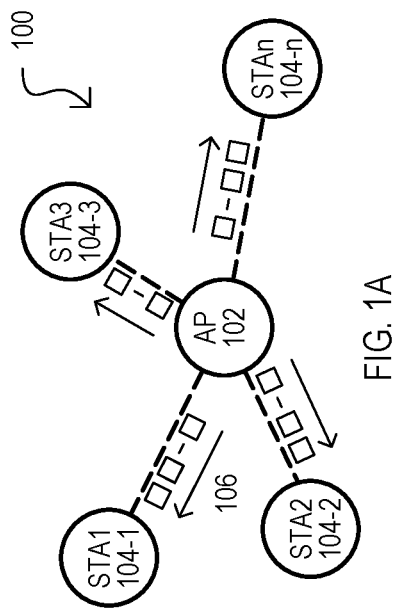
FIG. 1A is a block diagram of a wireless system for providing data bursts from a transmitting device to multiple receiving devices according to embodiments.

According to embodiments, a wireless network can include a transmitting device (e.g., an AP) that can transmit sequences of data values to multiple receiving devices (e.g., STAs). The transmitting device can transmit a message which can reserve the medium for a transmission duration during which a burst of data frames can be transmitted for multiple receiving devices. According to embodiments, a transmission duration can take into account the various operations included in a burst transmission, including interframe spacings, acknowledgements, and in some embodiments, upload data from the receiving devices to the transmitting device.

According to embodiments, the data frames can be audio data for multiple audio data receivers. The burst transmission of data can ensure the audio data meets a predetermined latency.

According embodiments, a transmitting device can issue a control frame that includes a single transmission duration value (e.g., Network Allocation Vector, NAV) for all data frames. However, other embodiments can include data frames that include a transmission time for a next data frame, thus each data frame can extend the transmission duration until a last data frame of the burst is reached.

According to embodiments, a transmitting device can issue a beacon packet for reception by all receiving devices. The beacon packet can include network parameters which enable the transmitting device to control the medium for a transmission duration in which a burst of data frames are sent to multiple stations. In other embodiments, a transmission device can negotiate sequential wake times for the receiving devices. The burst of data frames can then be transmitted to each receiving device during its corresponding wake time.

In the various embodiments below, like items are referred to by the same reference characters, but with the leading digit(s) corresponding to the figure number.

Figure 1B:
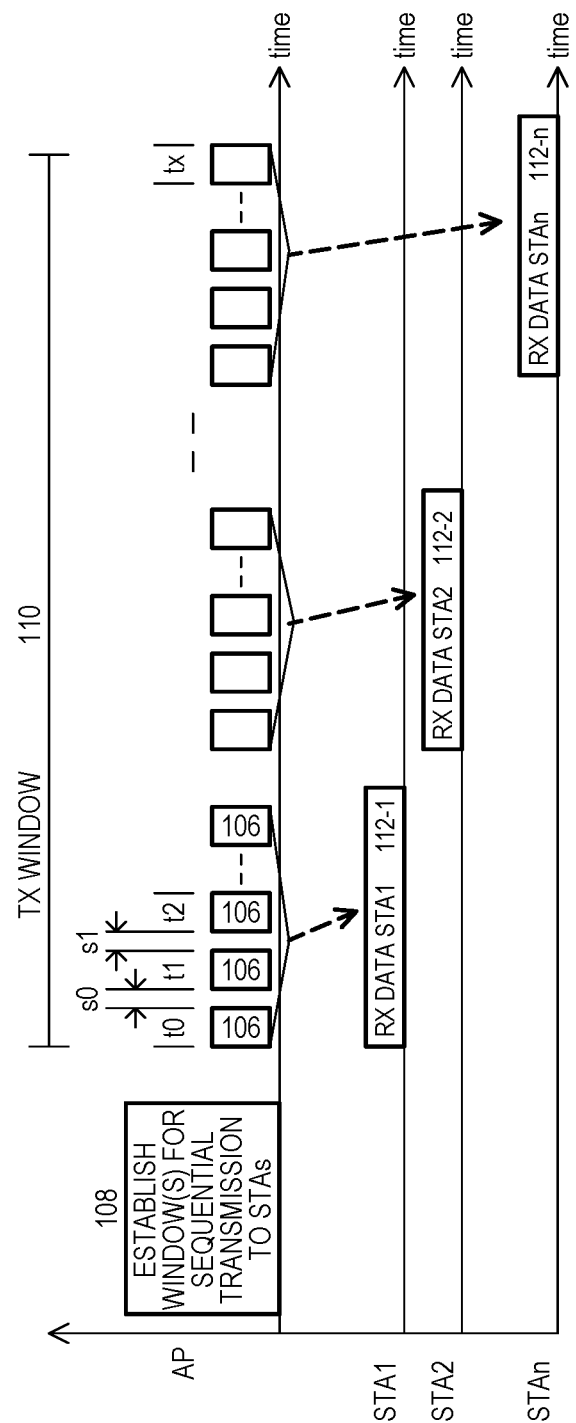
FIG. 1B is a timing diagram of data burst operations according to an embodiment.

FIGS. 1A and 1B are diagrams showing a system and operations according to an embodiment. FIG. 1A is a block diagram and FIG. 1B is a timing diagram. Referring to FIG. 1A, a system 100 can include a transmitting device 102 and a number of receiving devices (104-1 to -n). A transmitting device 102 can transmit data in a wireless fashion to the receiving devices (104-1 to -n) over a medium. Transmitting device 102 is labelled "AP" and receiving devices (104-1 to -n) are labeled "STA", but this should not be construed as limiting the system 100 to any particular communication protocol.

Referring to FIG. 1B, a low latency data transmission operation will now be described. Transmitting device (AP) can establish a transmission window 108. Such an action can include communicating over the medium in any suitable fashion to take control over the medium for a transmission duration. The Transmission duration can be sufficient for data to be sent to all receiving devices (STA1 to STAn) with a predetermined latency. Such a transmission duration can include, but is not limited to, the time needed to transmit data frames as well as any interframe spacing between the data frames. The transmission duration can also take into account any other operations that occur according to the protocol used, including but not limited to, acknowledgements or upload data (i.e., data from a STA to the AP).

While the operation of establishing a transmission window 108 can have a variable duration, it can also have a maximum duration. In contrast, a subsequent data burst transmission can have an essentially fixed duration, as the various operations (e.g., data transmission times, interframe spacing, acknowledgement transmission times) can have essentially fixed times.

Accordingly, as shown in FIG. 1B, following the establishment of a transmission window 110 (with the predetermined transmission duration), AP can sequentially transmit data frames 106 having a same transmission time (t0 to tx) and same interframe spacing (s0, s1, etc.). In the embodiment shown, data frames are consecutively addressed to service each receiving device (STA1 to STAn) one after another. Thus, STA1 receives data 112-1, followed by STA2 receiving data 112-2, etc. However, such a sequential addressing should not be construed as limiting. Any other suitable addressing to receiving devices can be used, provided all STAs receive the appropriate data within the transmission window 110.

Devices (102, 104-1 to 104-n) of system 100 can operate according to a contention based protocol. A contention based protocol can enable the various devices (102, 104-1 to 104-n) to share a medium without pre-coordination. As but one of many possible example, a contention based protocol can include a device monitoring a medium for activity, and upon not detecting activity, commencing communication over the medium. In some contention based protocols, a first device can transmit a "request-to-send" or similar command, indicating it wishes to control the medium. In response, a device that is a target of the first device can return a "clear-to-send" or similar response, thus controlling the medium until the transactions are complete. The various IEEE 802.11 wireless standards are examples of contention based protocols.

FIG. 2 is a block diagram of another system 200 according to an embodiment. A system 200 can be one implementation of that shown in FIG. 1A. While embodiments can include systems operating according to any suitable protocol, a system 200 can operate according to an IEEE 802.11 wireless standard (referred to herein as WLAN). A system 200 can include a WLAN AP 202 and a number of WLAN STAs 204-1 to -n. System 200 can enable data burst operations such as those described herein, and equivalents. Thus, upon receiving data, the WLAN AP 202 can provide the data in bursts to each of WLAN STAs (204-1 to -n) with a predetermined latency. In some embodiments, WLAN AP 202 can provide bursts of real time data to WLAN STAs (204-1 to -n).

In some embodiments, WLAN AP 202 can be a "soft" AP (softAP). A softAP can be a computing device that is not originally designed to be an AP but can be configured into an AP by a programming operation (e.g., software).

In particular embodiments, system 200 can operate according to the IEEE 802.11ac and/or 802.11ax standard.

FIGS. 3A and 3B are timing diagrams showing data burst operations according to embodiments. The data burst operations of FIGS. 3A and 3B can be executed by a system 200 like that shown in FIG. 2 as but one of many possible systems.

FIG. 3A is a timing diagram showing operations of an AP and a number of STAs. An AP can receive data for transmission over a medium to multiple STAs (i.e., addressed STAs). In response to such data, an AP can determine a transmission duration for the data. A transmission duration can include the transmission time for each data frame (DL DATA1 306-1 to DL DATAx 306-x), responses from STAs (i.e., CTS and ACKs for each data frame), and interframe spacing, which in the embodiment shown can be a Short InterFace space (SIFS).

In the embodiment shown, DL DATA1 306-1 to DL DATAx 306-x can have transmission times t1 to tx, respectively. In some embodiments, DL DATA1 306-1 to DL DATAx 306-x can have uniform data sizes, and t1 to tx can be the same. However, in other embodiments, any of t1 to tx can be different from one another. A CTS response from a STA can have a duration r0, while ACKs can have uniform durations of r1. Accordingly, in response to transmission data, AP can determine an transmission duration 310 of no less than $(t1+t2+t3 \ldots +tx)+r0+(x*r1)+((x+1)*SIFS)$. Because these values are not variable, the AP can ensure delivery of the data within the transmission duration (which can be selected to meet a desired latency). In some embodiments, an AP can add a small guard band value to arrive at a total transmission duration 310.

Referring still to FIG. 3A, the data burst operation will now be described.

An AP can wait for a variable back-off time 316 before transmitting an RTS 308 on the medium. The RTS 308 can be addressed to one of the STAs that is to receive data, and can include a NAV timer value equal to the transmission duration 310. Thus, non-addressed STAs will not contend for the medium for the transmission duration 310. After the RTS 308, AP can wait to detect a CTS after a SIFS period.

Upon detecting a CTS 314-1, AP can start a data burst operation. DL DATA1 306-1 can be transmitted to an addressed STA. AP can then wait to detect an ACK 314-2 corresponding to DL DATA1 306-1. Upon detecting the ACK, AP can transmit the next data frame (DL DATA2 306-2) and wait for the corresponding ACK 314-2. This operation can continue until the entire burst of data is complete. It is understood that data frames (DL DATA1 306-1 to DL DATAx 306-x) can be addressed to different STAs.

FIG. 3B is a timing diagram showing another data burst operation according to an embodiment. The data burst operation of FIG. 3B can be like that of FIG. 3A, however a block acknowledgement (B-ACK 314-3) can be used, rather than individual ACK following each data frame.

A block acknowledgement (B-ACK 314-3) can have a duration of r2. Accordingly, in response to transmission data, the AP in FIG. 3B can determine an transmission duration 310' of no less than (t1+t2+t3 . . . +tx)+r0+r2+((x+1)*SIFS). Again, because these values are not variable, the AP can ensure delivery of the data within the transmission duration. As in the case of FIG. 3A, an AP can add a small guard band value to arrive at a total transmission duration 310'.

Referring still to FIG. 3B, AP can wait for a variable back-off time 316 before transmitting an RTS 308'. Upon detecting a CTS 314-1, AP can start a data burst operation. Data frames (DL DATA1 306-1 to DL DATAx 306-x) can be transmitted sequentially, separated from one another by a SIFS time. The AP can then wait to detect B-ACK 314-3 corresponding to the data frames (DL DATA1 to DL DATAx).

In particular embodiments, data burst operations of FIGS. 3A and/or 3B can be executed by a system operating according to the IEEE 802.11ac standard.

Figure 4A:
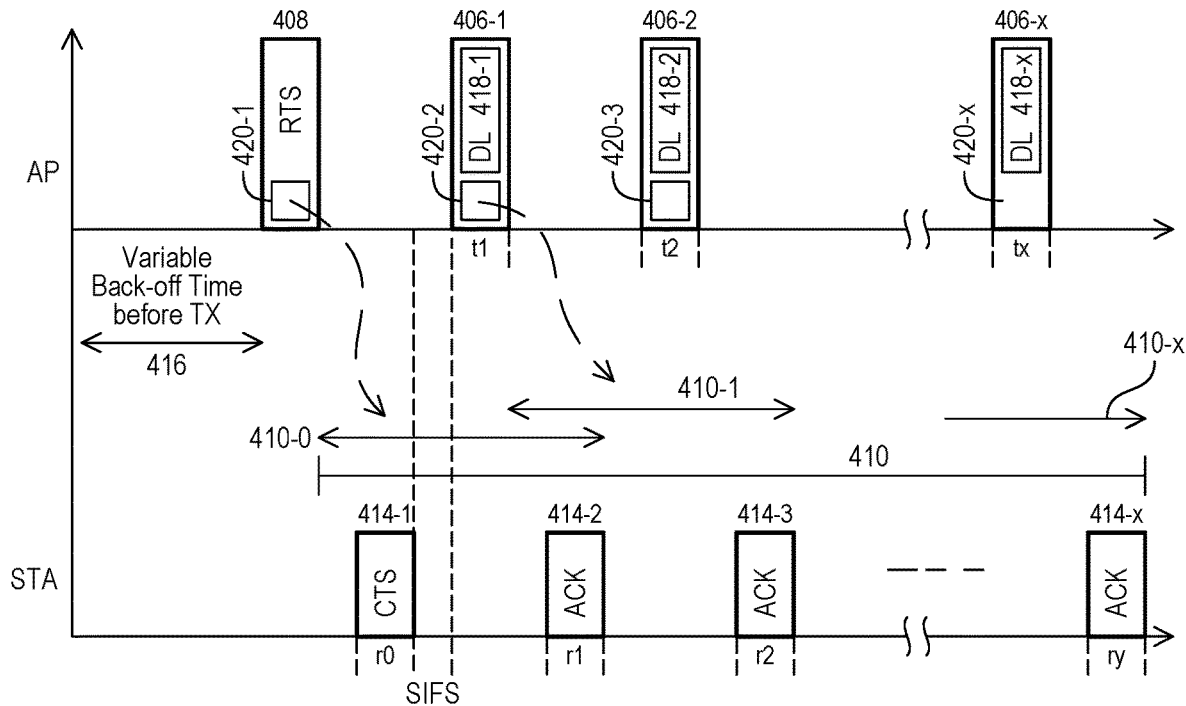
FIGS. 4A and 4B are timing diagrams showing data transmission operations in which transmissions of a data frame can be used to reserve a medium for a next data frame in a burst of data frames to multiple stations.
Figure 4B:
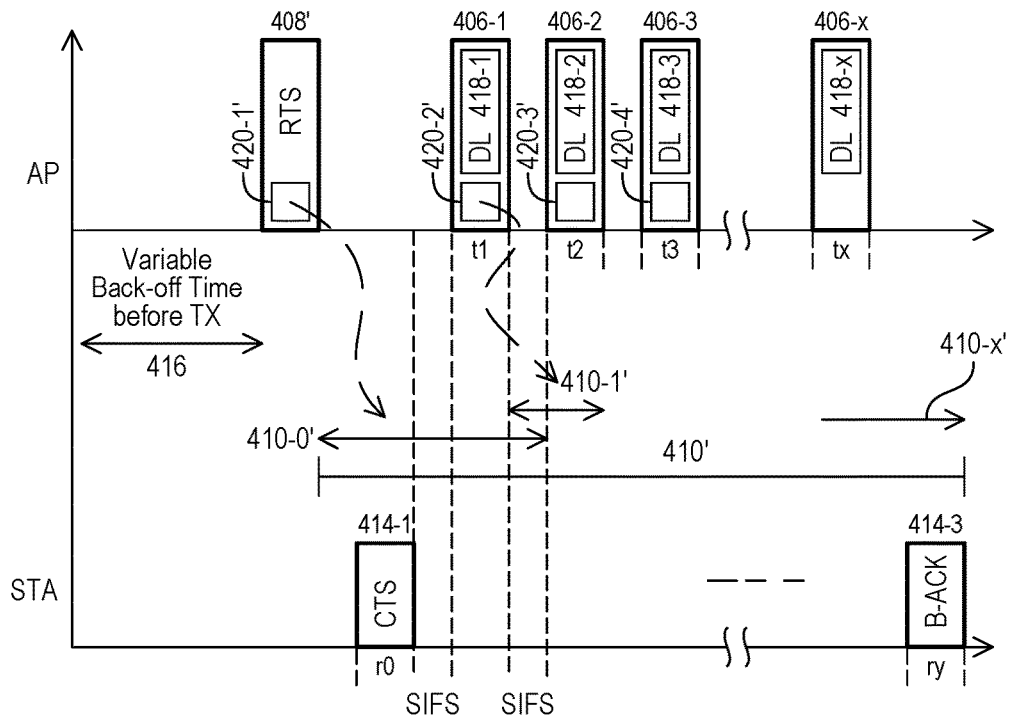

While embodiments can include the transmission of a single packet/frame containing an entire transmission duration, in other embodiments, a transmission duration can be established by a series of timing values that together can cover a transmission duration for a data burst. FIGS. 4A and 4B show examples of such embodiments.

FIGS. 4A and 4B are timing diagrams showing data burst operations according to further embodiments. The data burst operations of FIGS. 4A and 4B can be executed by a system 200 like that shown in FIG. 2 as but one of many possible systems.

FIG. 4A is a timing diagram showing operations of an AP and a number of STAs. An AP can receive data for transmission over a medium to multiple stations. In response to such data, an AP can determine a transmission duration for the data.

However, unlike the embodiments of FIGS. 3A and 3B, an AP can determine a transmission time (410-1 to 410-x) corresponding to each portion of data (418-1 to 418-x). Thus, a total transmission duration 410 can include all non-overlapping portions of the transmission times (410-1 to 410-x). In such an arrangement, each transmission from the AP can include the transmission time for a next transmission in the burst.

In the embodiment shown, data frames 406-1 to 406-x can include data portions 418-1 to 418-x as well as time values 420-2 to 420-x. Data frames (406-1 to 406-x) can have transmission times t1 to tx, respectively. Times t1 to tx can be the same or can be different. CTS, ACK and SIFS can have the values as noted for FIG. 3A.

Referring still to FIG. 4A, a first transmission from AP can be an RTS 408 which can include time value 420-1 corresponding to data frame 406-1. Time value 420-1 can result in the medium being contention free for transmission time 410-0, which can include the transmission of a first SIFS, CTS 414-1, a second SIFS, the data frame 406-1, a third SIFS, and a corresponding ACK 414-2 (i.e., t1+r0+r1+(3*SIFS)). A second transmission from AP can be the data frame 406-1. This data frame 406-1 can include a time value 420-2 corresponding to data frame 406-2. This second time value 420-2 can result in the medium being contention free for the next transmission time 410-1, which can include a first SIFS, the data frame 406-2, a second SIFS, and a corresponding ACK 414-2. Thus, the medium can remain unavailable to non-addressed STA for a next portion of the total transmission duration 410. This can continue until a last transmission of the burst, data frame 406-x, which may not include a time value.

Referring still to FIG. 4A, the data burst operation will now be described.

An AP can wait for a variable back-off time 416 before transmitting an RTS 408 on the medium. The RTS 408 can be addressed to one of the addressed STAs and can include a time value 420-1 (e.g., NAV timer value) for transmission time 410-0. This ensures, the medium can be reserved for the transmission of data frame 406-1 (along with corresponding SIFS and ACK, as noted above). Upon detecting a CTS 414-1, AP can start a data burst operation. Data frame 406-1 can be transmitted to an addressed STA, and can include a next time value 410-2 (e.g., NAV timer value), which can serve to control the medium for the next data frame 406-1. AP can then wait to detect an ACK 414-2 corresponding to data frame 406-2. Upon detecting the ACK, AP can transmit the next data frame 406-2 which will include the next time value 420-3. In this way, each transmission (e.g., packet/frame) from the AP in the burst operation can provide a timer for a next transmission until a last data frame of the burst is transmitted.

FIG. 4B is a timing diagram showing another data burst operation according to an embodiment. The data burst operation of FIG. 4B can be like that of FIG. 4A, however a B-ACK can be used, rather than individual ACK following each data frame.

Thus, in FIG. 4B, a time value 420-1' can provide transmission times (410-1' to 410-x') like those of FIG. 4A, but without any time for ACKs in response to each data frame, except for transmission time 410-x', which can include time for a B-ACK 414-3. Otherwise, operations can be like those described for FIG. 4A.

In one particular embodiment, a data burst operation of FIGS. 4A and/or 4B can be executed by a system operating according to the IEEE 802.11ac standard.

Figure 5:
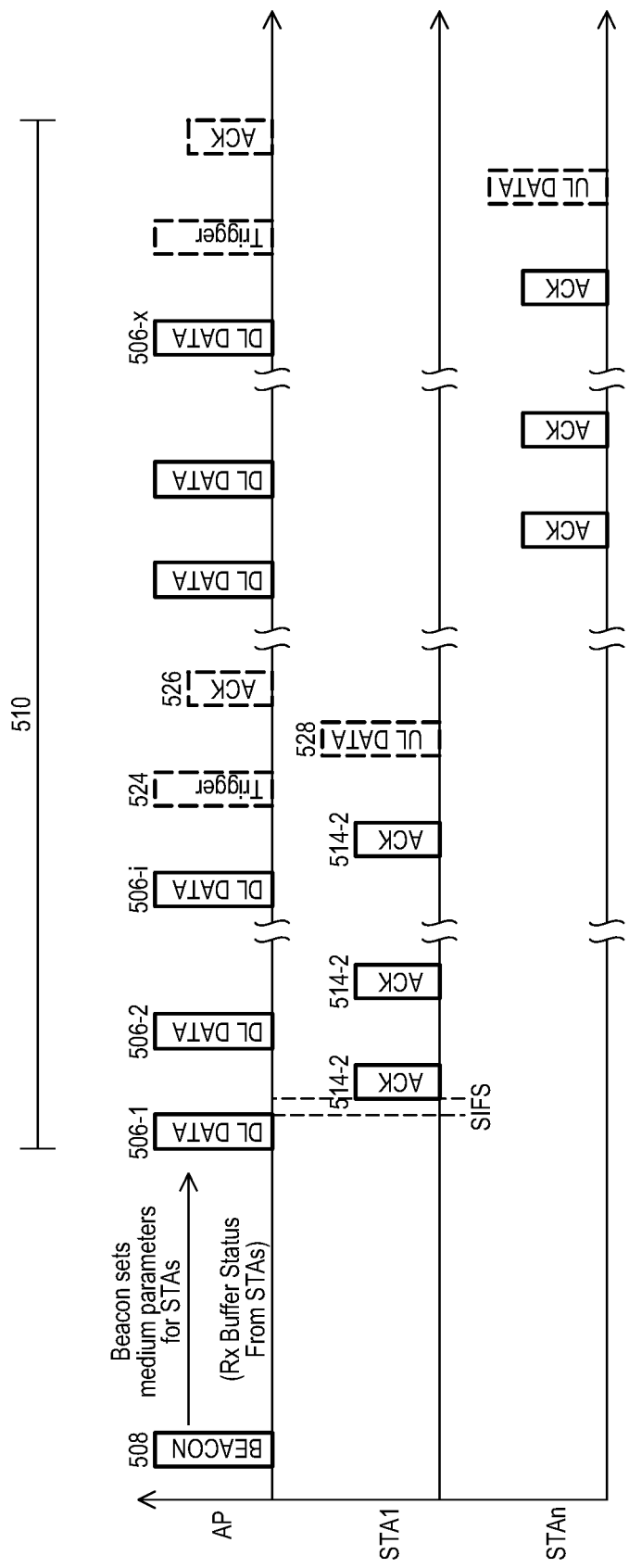
FIG. 5 is a timing diagram showing data transmission operations in which medium parameters can be established that enable an Access Point (AP) to control a medium to transmit a burst of data to multiple stations in a set transmission duration.
Figure 6:
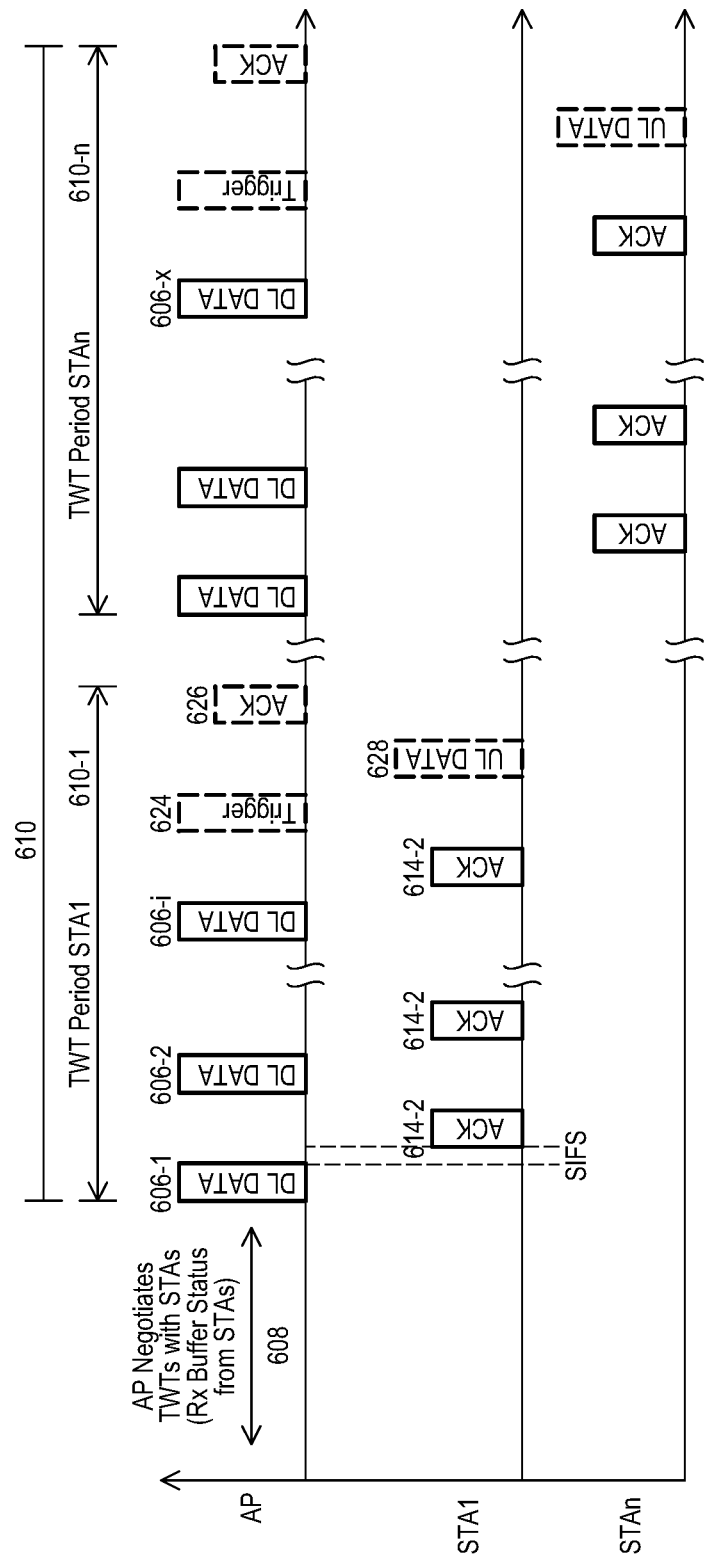
FIG. 6 is a timing diagram showing data transmission operations in which target wake times for stations can be established to enable a burst of data to multiple stations in a set transmission duration.

Embodiments can also use parameter setting features of a protocol to setup a transmission duration for sequential data burst to multiple receiving devices. FIGS. 5 and 6 show examples of such embodiments.

FIG. 5 is a timing diagram showing operations of an AP and a number of STAs according to a further embodiment. An AP can receive data for transmission over a medium to multiple STAs (STA1 to STAn). In response to such data, an AP can determine a transmission duration for the data. An AP can then issue a beacon transmission (e.g., beacon packet) that can include parameters for the medium access that can enable an AP to control operations on the medium for a transmission duration. Optionally, a transmission duration can also include time for data upload operations (data transmissions from STAs to the AP).

Referring to FIG. 5, a transmission duration 510 can include the transmission time for each data frame (DL DATA), corresponding ACKs for each data frame and SIFS. In the event data uploading is included, a transmission duration 510 can also include transmission times for a trigger transmitted from the AP, the upload data from a STA (UL DATA), the AP ACK for the upload data, and intervening SIFS.

Referring still to FIG. 5, the data burst operation will now be described.

An AP can issue a beacon packet 508. A beacon packet 508 can include medium access parameter information received by all STAs of the system and can enable the AP to control the medium for the transmission duration 510. Accordingly, during the transmission duration 510, the AP can control downlink (and uplink) operations, thus ensuring there is no medium contention to interrupt the data burst. In embodiments that include data uploads, an AP can also receive buffer status data from the STAs. Based on such information, AP can determine if a data upload is to occur for a STA addressed in the burst, and include the time necessary for the data upload in the transmission duration 510.

Once the parameters of the beacon packet 508 have been established, a data burst operation can begin. A first data frame 506-1 can be transmitted and an AP can wait a SIFS period for an ACK. When the ACK 514-2 is received, after another SIFS period, the AP can transmit the next data frame 506-2. This can continue until all the data frames are transmitted.

In the embodiment shown, an AP can burst data to each station sequentially, starting with STA1 and ending with STAn. Further, data can be uploaded from each station following the transmission of data to that station. Thus, as shown in FIG. 5, following data frame 506-i and the reception of the corresponding ACK 514-2, the AP can transmit a trigger frame 524. In response to the trigger frame 524, following a SIFS period, STA1 can transmit upload data 528 to the AP. Such upload data 528 can correspond to buffer status data previously received by the AP, and so will match the time allocated to it by the AP. Following a SIFS period, the AP can acknowledge the upload data with an ACK 526.

In the embodiment shown, such operations can be repeated for each STA until all STAs have received download data, and uploaded any data as needed. However, the particular order shown in FIG. 5 should not be construed as limiting. Data frames (506-1 to -x) and upload data (e.g., 536) can be arranged in any suitable fashion within the transmission duration 510.

It is understood that in alternate embodiments, operations like those shown in FIG. 5 can utilize a block acknowledgement. In such an arrangement, a transmission duration 510 would not include ACKs for each data frame, as understood from FIGS. 3B and 4B.

In one particular embodiment, a data burst operation of FIG. 5 can be executed by a system operating according to the IEEE 802.11ax standard, and a beacon packet 508 can set Multi-User Enhanced Distributed Channel Access (MU EDCA) parameters to establish control of the medium by the AP as well as the transmission duration 510.

FIG. 6 is a timing diagram showing operations of an AP and a number of STAs according to another embodiment. An AP can receive data for transmission over a medium to multiple STAs. In response to such data, an AP can negotiate with the STAs to establish wake times for the STAs within a given transmission duration. During its assigned wake time, a STA can receive data from and transmit data to the AP. However, outside of its wake time, the STA will not access the medium. The duration of wake times can be set to enable a burst of data to the corresponding STA. Optionally, a wake time can also include time for the transmission of upload data from the STA to the AP.

Referring still to FIG. 6, the data burst operation will now be described.

An AP can negotiate 608 with the STAs to set a wake time (610-1 to 610-n) for each STA. The wake times (610-1 to 610-n) can determine, or be included in, the transmission duration 610 for the data burst. As in the case of FIG. 5, in embodiments that include data uploads, an AP can also receive buffer status data from the STAs.

Once the wake times (610-1 to 610-n) have been established, a data burst operation can begin. A transmission duration 610 can start with a wake time 610-1 for STA1. A first data frame 606-1 can be transmitted that is addressed to STA1, and an AP can wait a SIFS period for an ACK. When the ACK 614-2 is received, following another SIFS period, the AP can transmit the next data frame 606-2 for STA1. This can continue until all the data frames for STA1 are transmitted. In the embodiment shown, an AP can also receive upload data. Thus, following data frame 606-i and the reception of the corresponding ACK 614-2, the AP can transmit a trigger frame 624. In response to the trigger frame 624, following a SIFS period, STA1 can transmit upload data 628 to the AP. After another SIFS period, the AP can acknowledge the upload data with an ACK 626. The wake time 610-1 for STA1 can then end, and a wake time for a next STA can begin.

Operations can occur for the next STA during its wake time in the same fashion. A burst of data can be sent from the AP, and upload data, if any, can be sent from the STA to the AP. This can be repeated for all STAs until such operations occur for a last station (STAn) in the last wake time 610-n.

It is understood that in alternate embodiments, operations like those shown in FIG. 6 can utilize a block acknowledgement. In such an arrangement, a transmission duration 610 would not include ACKs for each data frame, as understood from FIGS. 3B and 4B.

In one particular embodiment, a data burst operation of FIG. 6 can be executed by a system operating according to the IEEE 802.11ax standard by an AP negotiating target wake times for each station that is to receive data.

As understood from above, systems and methods can operate according to any suitable protocol, thus frames will take the form appropriate for the protocol. Examples of transmissions according to particular protocols will now be described, but such examples should not be construed as limiting.

Figure 7A:
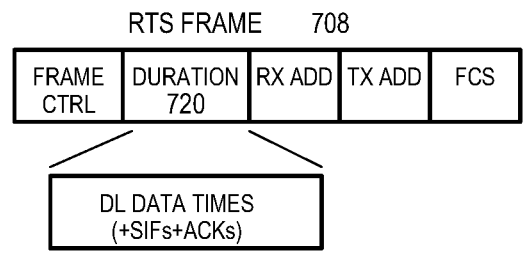
FIGS. 7A to 7C are diagrams of frame/packet formats that can be included in embodiments.

FIG. 7A shows an RTS frame 708 that can be included in embodiments. RTS frame 708 can include various fields, including a frame control field (FRAME CTRL), duration field (DURATION) 720, receive address (RX ADD), transmit address (TX ADD), and frame check sequence (FCS). Duration field 720 can establish a transmission duration as described herein, that is time needed to transmit a burst of data to multiple STAs. In the embodiment shown, this can include times for the bursted download data (DL DATA TIMES) and corresponding SIFS and ACKs times, as described herein, and equivalents.

Figure 7B:
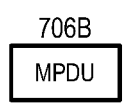
Figure 7C:
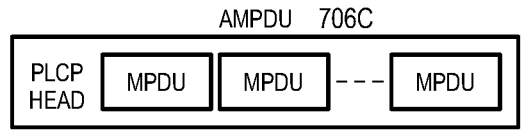

FIG. 7B shows a data frame 706B that can be included in embodiments. Data frame 706B can be a MAC Protocol Data Unit (MPDU) according to an IEEE 802.11 standard. FIG. 7C shows another data frame 706C that can be included in embodiments. Data frame 706C can be an aggregate MPDU (A-MPDU) according to an IEEE 802.11 standard. A-MPDU can aggregate MPDUs for a same destination. It is understood that data frames 706B/706C can include duration fields to establish transmission times for a next data frame, as described with reference to FIGS. 4A and 4B.

Figure 8:
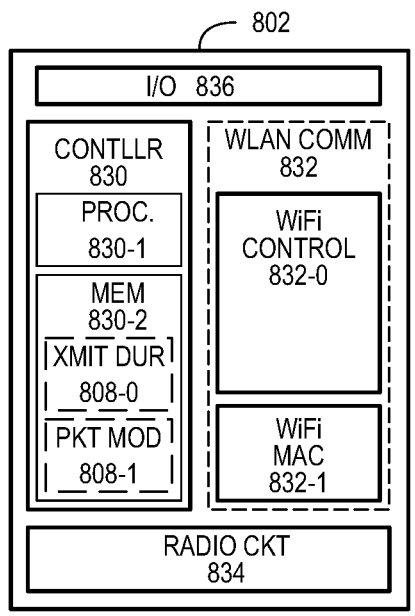
FIG. 8 is block diagram of a device according to an embodiment.

FIG. 8 is a block diagram of an AP device 802 according to an embodiment. In some embodiments, device 802 can be one particular implementation of either or both of those shown as 102 and 202 in FIGS. 1A and 2. A device 802 can include communication circuits 832, controller 830, radio circuits 834, and input/output (I/O) circuits 836. Communication circuits 832 can be WLAN circuits, including a WiFi control circuit 832-0 and WiFi media access control (MAC) circuits 832-1. WLAN circuits can operate in any suitable band, including a 2.84 GHz band, 5.0 GHz band and/or 6.0 GHz band.

Radio circuits 834 can include circuits for receiving and transmitting signals according to at least one protocols. Radio circuits 834 can include any suitable circuits according to a selected protocol, and in some embodiments can include physical interface (PHY) circuits and baseband circuits. In some embodiments, radio circuits 834 can transmit/receive on any internationally recognized industrial, scientific, or medical (ISM) band.

A controller 830 can control transmissions by communication circuits 832. In some embodiments, a controller 836 can include circuits (or instructions executable by circuits) for determining a transmission duration for received data values, as well as processes for adjusting values in data frames/packets to establish a transmission duration, as described herein, and equivalents. In the embodiment shown, a controller 830 can include a processor section 830-1 and a memory section 830-2. Memory section 830-2 can include, or can be written to include, instructions for determining a transmission duration 808-0 and generate packet data 808-1 according to any of the embodiments described herein or equivalents.

I/O circuits 836 can enable control of device 802 by inputs external to the device 802. I/O circuits 836 can include circuits that enable communication with the device according to any suitable method, including any of various serial data communication standards/methods including but not limited to: serial digital interface (SDI), universal serial bus (USB), universal asynchronous receiver transmitter (UART), I$^2$C, or I$^2$S.

In some embodiments, device 802 can be an integrated circuit device, with the various portions being included in one integrated circuit package or formed in a same integrated circuit substrate.

While embodiments can include systems and devices for transmitting any suitable data within a set transmission duration, particular embodiments can advantageously use set transmission durations to ensure latency in real time data streams, such as audio data and/or video data.

Figure 9:
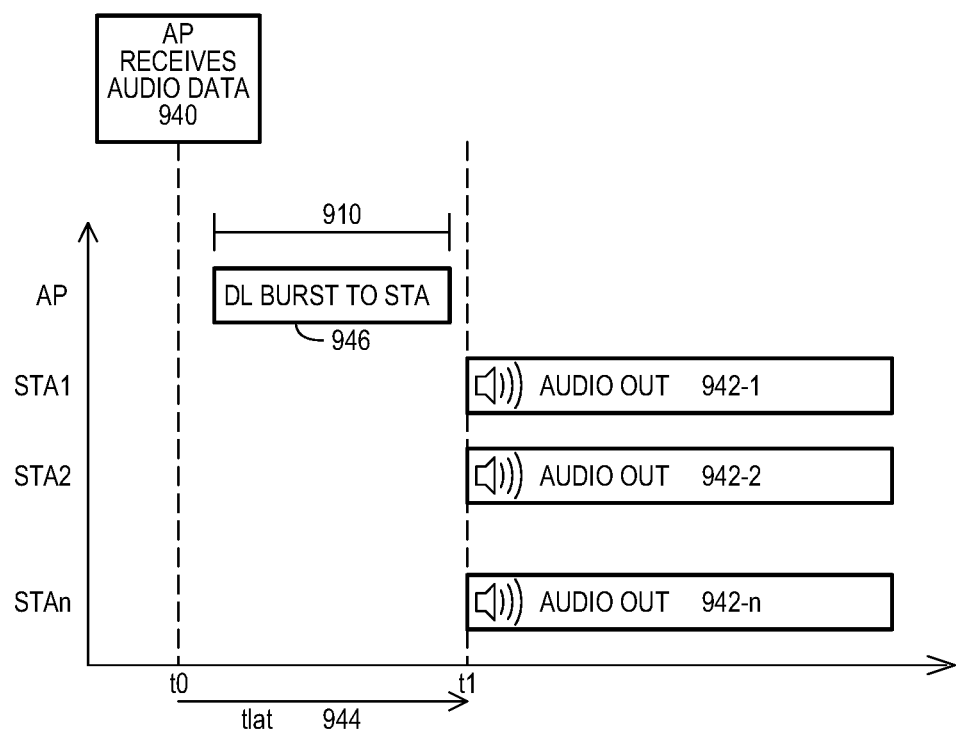
FIG. 9 is a timing diagram showing the transmission of audio data to multiple audio receivers within a given latency according to an embodiment.

FIG. 9 shows operations of an audio system according to an embodiment. Such operations can be executed by any of the systems or devices described herein and equivalents. FIG. 9 is a timing diagram showing actions of an AP and multiple stations (STA1 to STAn), where the stations generate audio output signals (942-1 to 942-$n$) from data bursts received from the AP.

Referring to FIG. 9, at time t0 an AP can receive audio data 940. Such audio data can be for transmission to STA1 to STAn. At time t0, or shortly thereafter (e.g., due to a back-off time or the like), an AP can start a data burst operation 946. Such a data burst operation can take the form of any of those described herein and equivalents. A data burst operation 946 can occur over a set transmission duration 910.

At time t1, which can be at the end of the data burst operation 946 or shortly thereafter, stations can generate audio signals (942-1 to 942-$n$). The transmission duration 910 can be used to ensure that a latency value (tlat) is met.

In some embodiments, a latency value can be no more than 30 ms, and in other embodiments no more than 20 ms.

Figure 10:
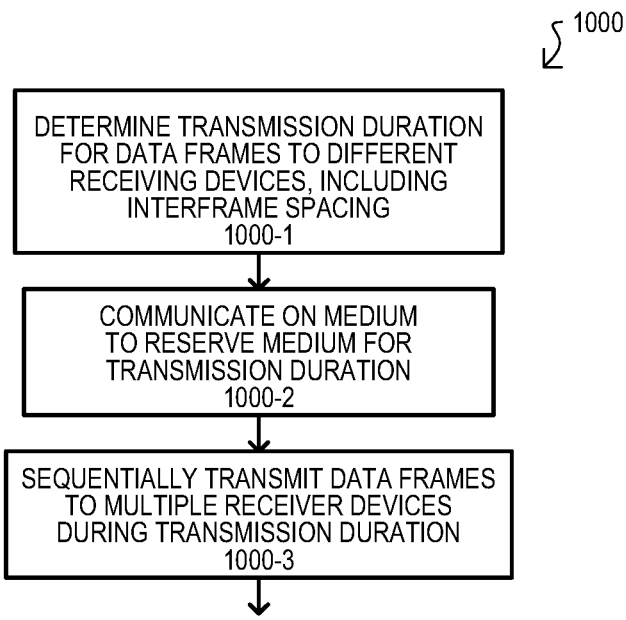
FIG. 10 is a flow diagram of a method according to an embodiment.

FIG. 10 is a flow diagram of a method 1082 according to another embodiment. In some embodiments, a method 1000 can be executed by a transmitting device (e.g., AP) as disclosed herein, or an equivalent. Method 1000 can include determining a transmission duration for data frames to different receiving devices 1000-1. Such a transmission duration can include interframe spacing between data frames. Determining transmission durations can take the form of any of those disclosed herein and equivalents.

A method 1000 can communicate on a medium to reserve the medium for the transmission duration 1000-2. Such an action can ensure there is no contention on the medium when the data frames are transmitted. Communication can include one-way communication between a transmitting device and receiving devices (e.g., beacon packet), or two-way communication (e.g., request and response, negotiation).

Once the medium is reserved, data frames can be sequentially transmitted to multiple receiver devices during the transmission duration 1000-3. Such an action can include any of the data burst operations as disclosed herein, or equivalents.

Figure 11:
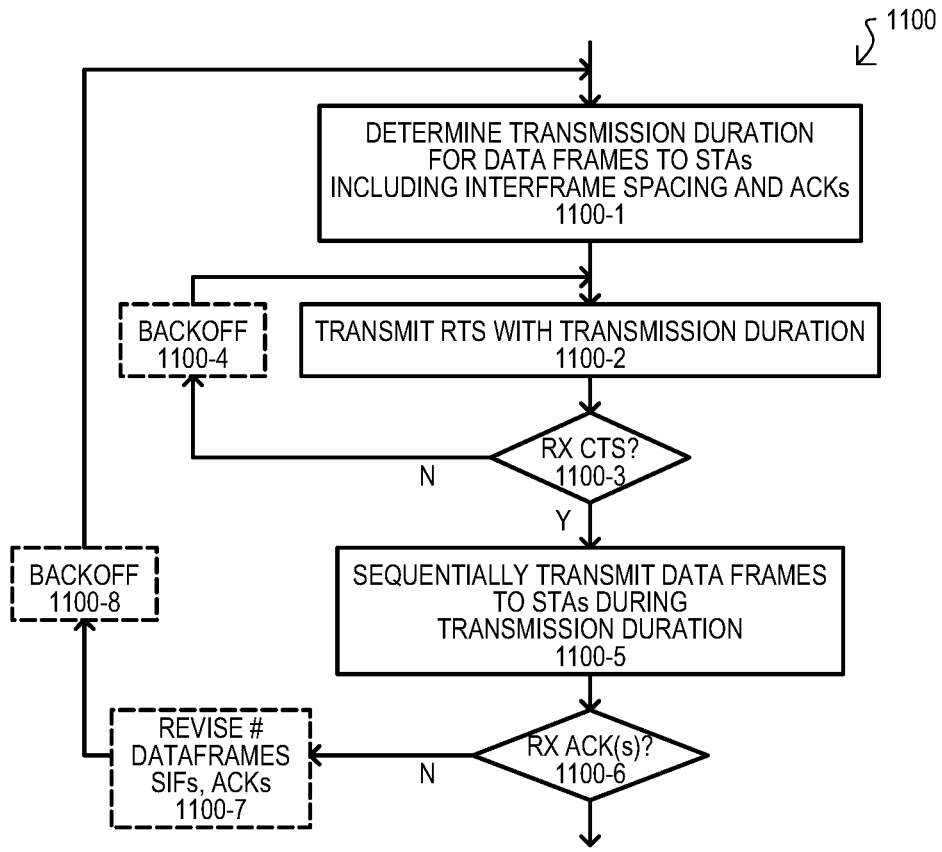
FIG. 11 is a flow diagram of a method according to another embodiment.

FIG. 11 is a flow diagram of a method 1100 according to another embodiment. A method 1100 can be executed by an AP as disclosed herein, or an equivalent. Method 1100 can include determining a transmission duration for data frames to STAs, including interframe spacings and any acknowledgements 1100-1. Determining a transmission duration can take the form of any of those disclosed herein and equivalents, including those where STAs return ACKs for each data frame, or arrangements where block ACKs are employed.

A RTS can be transmitted on the medium that includes, or otherwise indicates the transmission duration 1100-2. Such an action can include any of those disclosed herein, and equivalents, including setting a NAV timer value. If a CTS is not received (N from 1100-3), a method 1100 can return to 1100-2. In some embodiments, this can also include a back-off time 1100-4 where other processes can contend for the medium.

If a CTS is received (Y from 1100-3), a method 1100 can sequentially transmit data frames to multiple stations within the transmission duration 1100-5. Such an action can include receiving ACKs from STAs (single or block ACKs) with transmissions being separated by interframe spacing.

If ACKs are not received (N from 1100-6), a method 1100 can return to 1100-1. In some embodiments, this can also include revising the criteria for determining a transmission duration 1100-7. For example, if some of the data frames were received by STAs, the time for such data frames, a next burst operation can exclude such data frames. In some embodiments there can also be a back-off time 1100-8 before another attempt is made to transmit the data frames (or remaining data frames).

Figure 12:
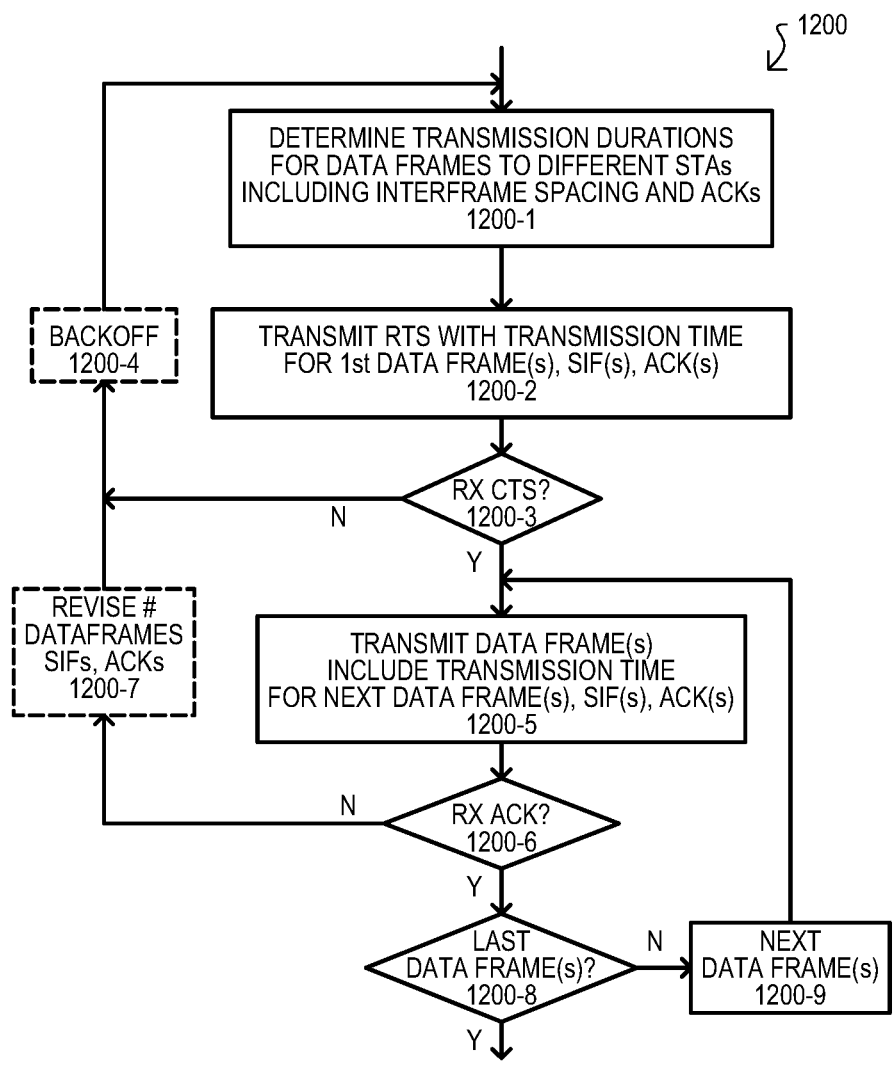
FIG. 12 is a flow diagram of a method according to another embodiment.

FIG. 12 is a flow diagram of a method 1200 according to another embodiment. A method 1200 can be executed by an AP as disclosed herein, or an equivalent. Method 1200 can include determining a transmission duration for data frames to STAs, including interframe spacings (e.g., SIFS) and any ACKs 1200-1. Determining a transmission duration can take the form of any of those disclosed herein and equivalents.

A RTS can be transmitted on the medium with a transmission time for a first data frame 1200-2. Such an action can include any of those disclosed herein, and equivalents, including setting a NAV timer value. If a CTS is not received (N from 1200-3), a method 1200 can return to 1200-1, and may include a back-off time 1200-4.

If a CTS is received (Y from 1200-3), a method 1200 can transmit a data frame (from a burst of data frames) including any ACKs or SIFS for the data frame 1200-5.

If an ACK is not received (N from 1200-6), a method 1200 can return to 1200-1. This may include revising the criteria for determining a transmission duration 1200-7 and/or a back-off time 1200-4.

If an ACK is received (Y from 1200-6), if it is not for the last data frame (N from 1200-8), a next data frame can be transmitted with a duration time for a next data frame (1200-9, 1200-5).

Figure 13:
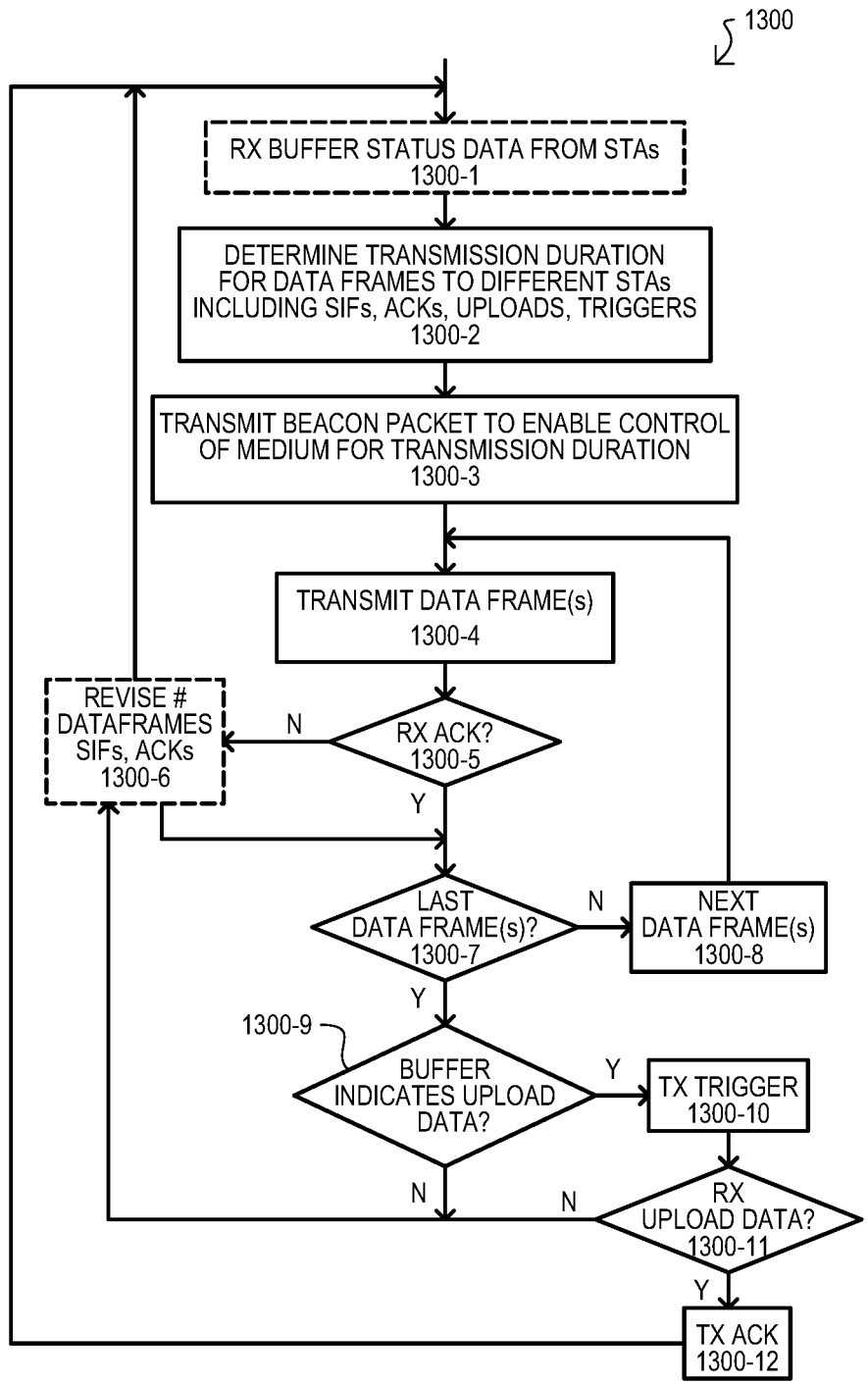
FIG. 13 is a flow diagram of a method according to another embodiment.

FIG. 13 is a flow diagram of a method 1300 according to another embodiment. A method 1300 can be executed by an AP as disclosed herein, or an equivalent. Optionally, a method 1300 can include reserving a portion of a transmission duration for upload data (i.e., data from a STA to the AP). In such an arrangement, a method 1300 can include receiving buffer status data from the STAs 1300-1. From such status data, a method 1300 can determine how much time should be reserved for the upload data in a transmission duration.

A method 1300 can include determining a transmission duration for data frames to STAs, including SIFS and any ACKs (as well as time needed for any data uploads) 1300-2. Determining a transmission duration can take the form of any of those disclosed herein and equivalents, including those with B-ACKs A beacon can be transmitted that can enable control of the medium for the transmission duration 1300-3. Such an action can include any of those described herein, or equivalents, including setting MU EDCA parameters in an IEEE 802.11ax compatible system, as but one of many possible examples.

A method 1300 can transmit a data frame (from a burst of data frames) 1300-4. If an ACK is not received (N from 1300-5), a method 1300 can return to 1300-1. This may include revising the criteria for determining a transmission duration 1300-6. If an ACK is received (Y from 1300-5), if it is not for the last data frame (N from 1300-7), a next data frame can be transmitted (1300-8, 1300-4).

In embodiments that include upload data within a transmission duration, a method 1300 can further include upload operations (1300-9 to 1300-12). If a buffer for a STA indicates upload data is available (Y from 1300-9), a method 1300 can transmit a trigger frame 1300-10 to elicit a data upload operation from the STA. If the upload data is not received (N from 1300-11), a method 1300 can return to 1300-1. In some embodiments, this may also include revising the criteria for determining a transmission duration 1300-6. If upload data is received (Y from 1300-11) a method can transmit an ACK to the STA (1300-12).

It is understood that the upload operations (1300-9 to 1300-12) could occur at various other points in a transmission duration (i.e., they do not have to follow a last download data frame).

Figure 14:
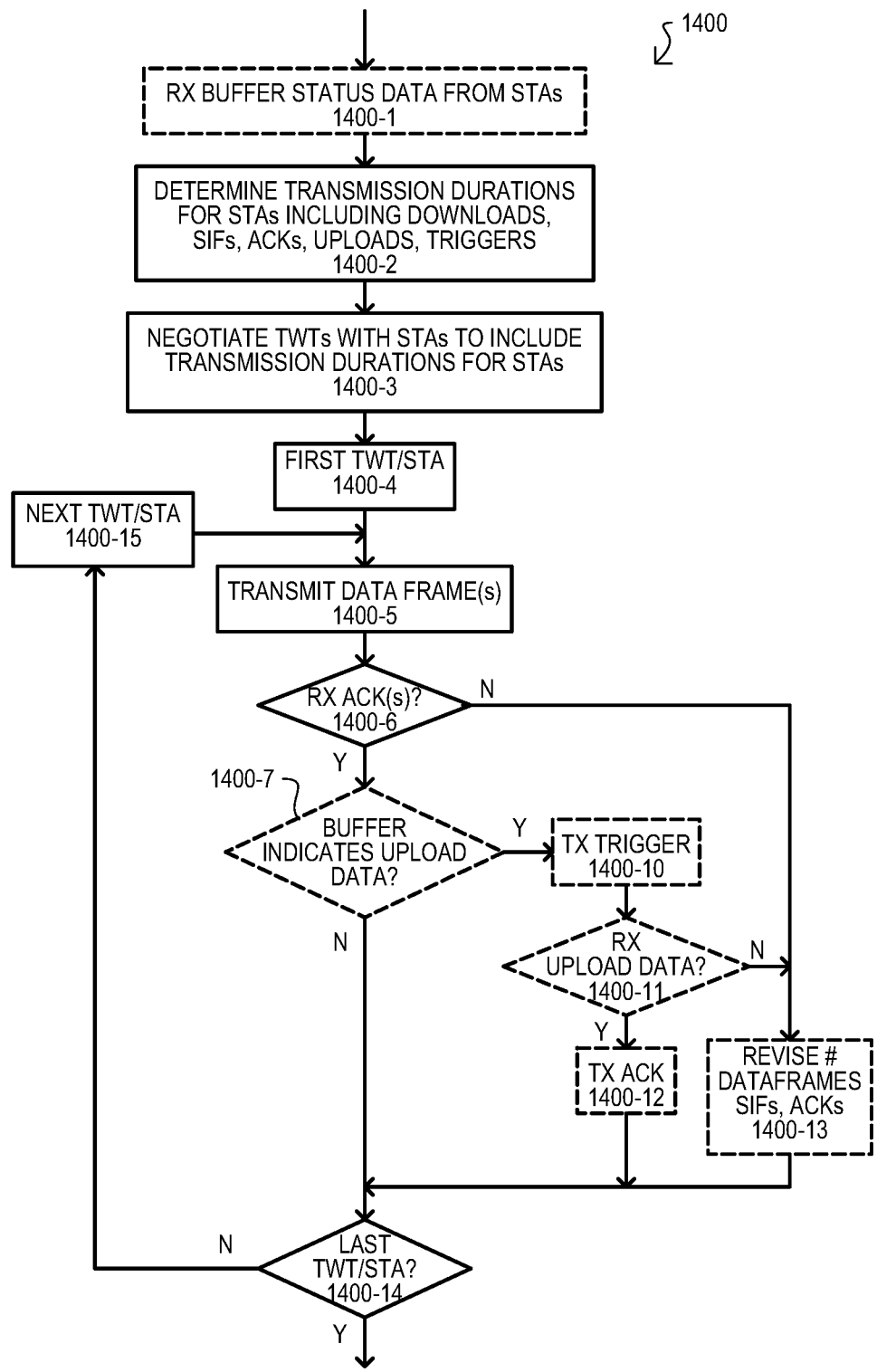
FIG. 14 is a flow diagram of a method according to another embodiment.
Figure 15:
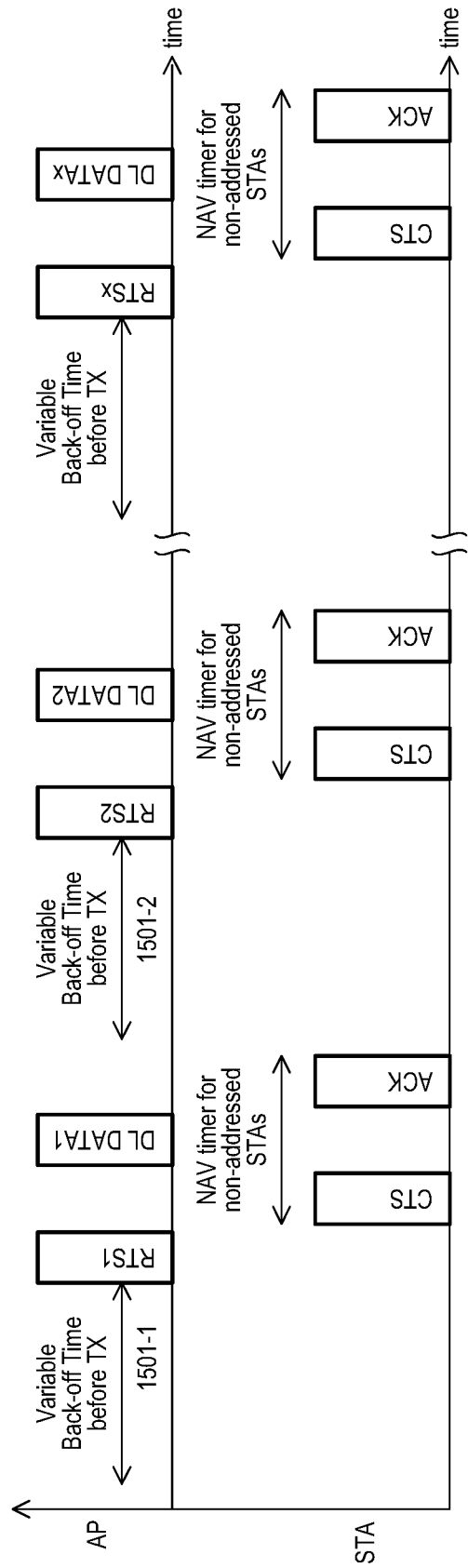
FIG. 15 is a diagram of conventional WLAN data transmission operations.

FIG. 14 is a flow diagram of a method 1400 according to another embodiment. A method 1400 can be executed by an AP as disclosed herein, or an equivalent. As in the case of FIG. 13, optionally a method 1400 can include reserving a portion of a transmission duration for upload data, and so can include receiving buffer status data from the STAs 1400-1.

A method 1400 can include determining a transmission duration for data frames to STAs, including SIFS and any ACKs (and data uploads, if included) 1400-2. Determining a transmission duration can take the form of any of those disclosed herein and equivalents, including those with B-ACKs A method 1400 can further include negotiating with STAs to establish wake times for each STA within the transmission duration 1400-3. Such an action can include initial communications between an AP and STA. In particular embodiments, this can include establishing target wake times (TWT) for each STA according the IEEE 802.11ax standard, as but one of many possible examples.

Within a transmission duration, when a first wake time for a STA begins 1400-4, a method 1400 can transmit a data frame (from a burst of data frames) 1400-5. If an ACK is received (Y from 1400-6) and the method 1400 is not on a last wake time (N from 1400-14), a method 1400 can wait for a next wake time 1400-15 and proceed to transmitting data frames for the corresponding STA 1400-5.

If an ACK is not received during a wake time (N from 1400-6), and the method is not on a last wake time (N from 1400-14), a method 1400 can wait for a next wake time 1400-15 and transmitting data frames for the corresponding STA 1400-5. Optionally, a method 1400 can revise the criteria for determining a transmission duration 1400-13.

In embodiments that include upload data within a wake time, a method 1400 can further include, if a buffer for the STA of the wake time indicates upload data is available (Y from 1400-7), transmitting a trigger frame 1400-10 to elicit a data upload operation from the STA. If the upload data is not received (N from 1400-11), a method 1400 can return to 1400-1. In some embodiments, a method 1400 may also revise the criteria for determining a transmission duration 1400-13. If upload data is received (Y from 1400-11) a method can transmit an ACK to the STA (1400-12).

It is understood that while upload operations (1400-7 to 1400-12) can occur in the same wake time as download operations, in other embodiments, upload operations could occur in a different wake time for the same STA (that occurs in the same transmission duration).

Embodiments herein can provide for wireless data transmissions from a transmitting device to multiple receiving devices that occur in a set time period (i.e., transmission duration). Such a capability can enable data to be transmitted within a predetermined latency, and so can greatly benefit wireless network applications that utilize real-time streaming data.

Particular embodiments can be directed to enabling the transmission of streaming audio data to multiple different audio receivers with a guaranteed maximum latency, such as no more than 20-30 ms.

While embodiments can execute channel communications according to any suitable protocol, in some embodiments such communications can be according to any suitable IEEE wireless standard, including but not limited to 802.12(a), 802.12(b), 802.12(g), 802.12(h), 802.12(ac) and/or 802.12 (ax). Further, embodiments can transmit across channels of any suitable wireless communication band, including but not limited to a 2.4 GHz band, 5.0 GHz band and/or 6.0 GHz band.

It should be appreciated that reference throughout this specification to "one embodiment" or "an embodiment"

means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claims require more features than are expressly recited in each claim. Rather, inventive aspects lie in less than all features of a single foregoing disclosed embodiment. Thus, the claims following the detailed description are hereby expressly incorporated into this detailed description, with each claim standing on its own as a separate embodiment of this invention.

What is claimed is:

1. A method, comprising:
   by operation of a transmitting device, determining a transmission duration for transmission of data frames to a plurality of different receiving devices, the transmission duration including interframe spacings that separate the data frames from one another;
   by operation of the transmitting device, transmitting a beacon packet for reception by all receiving devices that enables control of the medium by the transmitting device, the beacon packet including medium access parameters for the receiving devices for the transmission duration;
   by operation of the transmitting device, transmitting the data frames over the same medium to each of the plurality of receiving devices, individually and sequentially in time, during the transmission duration without another transmission to reserve the medium for any of the receiving devices; wherein
   the data frames transmitted during the transmission duration comprise bursts of multiple, sequential data frames, each burst being addressed to a different receiving device.

2. The method of claim 1, further including:
   determining an upload time for receiving upload data from at least one receiving device;
   including the upload time in the transmission duration; and
   receiving upload data from the at least one receiving device after transmitting data frames to the at least one receiving device and before transmitting data frames to a next receiving device in the sequence.

3. The method of claim 2, further including:
   receiving buffer status data for the at least one receiving device during one transmission duration; and
   determining the upload time for a next transmission duration from the buffer status data.

4. The method of claim 2, further including:
   after transmitting data frames to one receiving device, and before transmitting data frames to a next receiving device in the sequence, transmitting a trigger frame to the one receiving device to elicit upload data from the one receiving device.

5. The method of claim 1, further including:
   prior to transmitting the beacon, negotiating with the receiving devices to establish the medium access parameters for the receiving devices.

6. The method of claim 5, wherein:
   negotiating with the receiving devices includes establishing individual, sequential target wake times for each receiving device within the transmission duration.

7. The method of claim 1, wherein:
   the beacon packet is compatible with the IEEE 802.11ax standard.

8. A device, comprising:
   memory circuits formed in an integrated circuit (IC) substrate configured to store data frames for transmission to a plurality of receiving devices; and
   control circuits formed in the IC substrate and configured to
     determine a transmission duration for the transmission of the data frames to the receiving devices, the transmission duration including at least interframe spacings that separate one data frame transmission from a next data transmission,
     reserve the medium for the transmission duration by transmitting a beacon packet for reception by all receiving devices that enables control of the medium by the device, the beacon packet including medium access parameters for the receiving devices for the transmission duration,
     transmit the data frames over the medium to each receiving device individually and sequentially in time, during the transmission duration and without another transmission to reserve the medium; wherein
     the data frames transmitted during the transmission duration comprise bursts of multiple, sequential data frames, each burst being addressed to a different receiving device.

9. The device of claim 8, wherein:
   the control circuits are further configured to include an upload time in the transmission duration, the upload time being an amount of time for receiving upload data from at least one receiving device.

10. The device of claim 9, wherein:
    the control circuits are further configured to transmit a trigger frame during the transmission duration to elicit upload data from the at least one receiving device; wherein
    the trigger frame is transmitted after transmitting data frames to the at least one receiving device, and before transmitting data frames to a next receiving device in the sequence.

11. The device of claim 9, wherein:
    the control circuits are further configured to
    receive buffer status data from the receiving devices that indicates an amount of upload data for each receiving device, and
    determine the upload time from the buffer status data.

12. The device of claim 8, wherein:
    the control circuits are further configured to negotiate with each receiving device to establish sequential target wake times for each device within the transmission duration.

13. The device of claim 8, wherein:
    the data frames comprise audio data for each receiving device.

14. A system, comprising:
a plurality of receiving devices; and
a controller in communication with the receiving devices over a wireless network, the controller configured to
arrange data for transmission to the receiving devices into bursts of sequential data frames for each receiving device,
determine a transmission duration that includes at least the transmission of the data frames and at least interframe spacings between the data frames,
reserve a medium for the transmission duration by transmitting a beacon packet for reception by all receiving devices, the beacon packet including medium access parameters for the receiving devices for the transmission duration, and
transmit the data frames over the same medium to each of the receiving devices, individually and sequentially in time, during the transmission duration without another control message to reserve the medium; wherein
the data frames transmitted during the transmission duration comprise bursts of multiple, sequential data frames, each burst being addressed to a different receiving device.

15. The system of claim 14, wherein:
the controller is further configured to include an upload time in the transmission duration, the upload time being an amount of time for receiving upload data from at least one receiving device.

16. The system of claim 15, wherein:
the controller is further configured to transmit a trigger frame to a receiving device after transmitting data frames to the receiving device, and before transmitting data frames to a next receiving device in the sequence; and
the receiving devices are configured to transmit available upload data to the controller in response to receiving a trigger frame.

17. The system of claim 15, wherein:
the controller is further configured to
receive buffer status data from the receiving devices that indicates an amount of upload data for each receiving device, and
determine the upload time from the buffer status data.

18. The system of claim 14, wherein:
the receiving devices are configured to transmit an acknowledgement after receiving each data frame; and
the controller is configured to include time for the acknowledgements in the transmission duration.

19. The system of claim 14, wherein:
each receiving device is configured to transmit a block acknowledgement after receiving its sequence of data frame; and
the controller is configured to include time for the block acknowledgements in the transmission duration.

20. The system of claim 14, wherein:
the receiving devices comprise audio output devices; and
the data for transmission comprises real time streaming audio data.

* * * * *